June 26, 1956     F. LYIJYNEN ET AL     2,751,626
APPARATUS AND METHOD FOR MAKING DIES
Filed Feb. 2, 1953     3 Sheets-Sheet 2
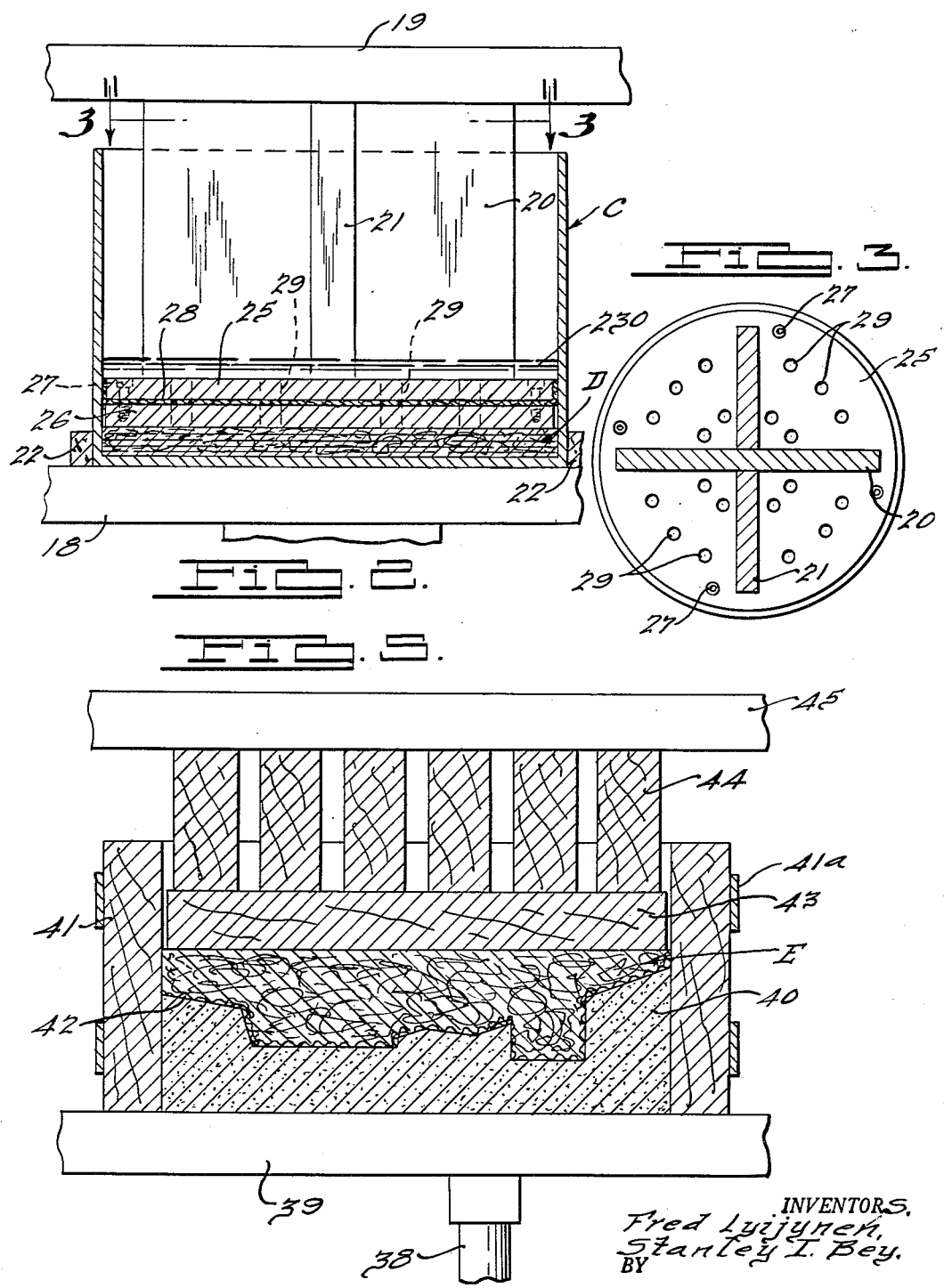
INVENTORS.
Fred Lyijynen,
Stanley I. Bey.
BY
Oliver Jamison Gray
ATTORNEY.

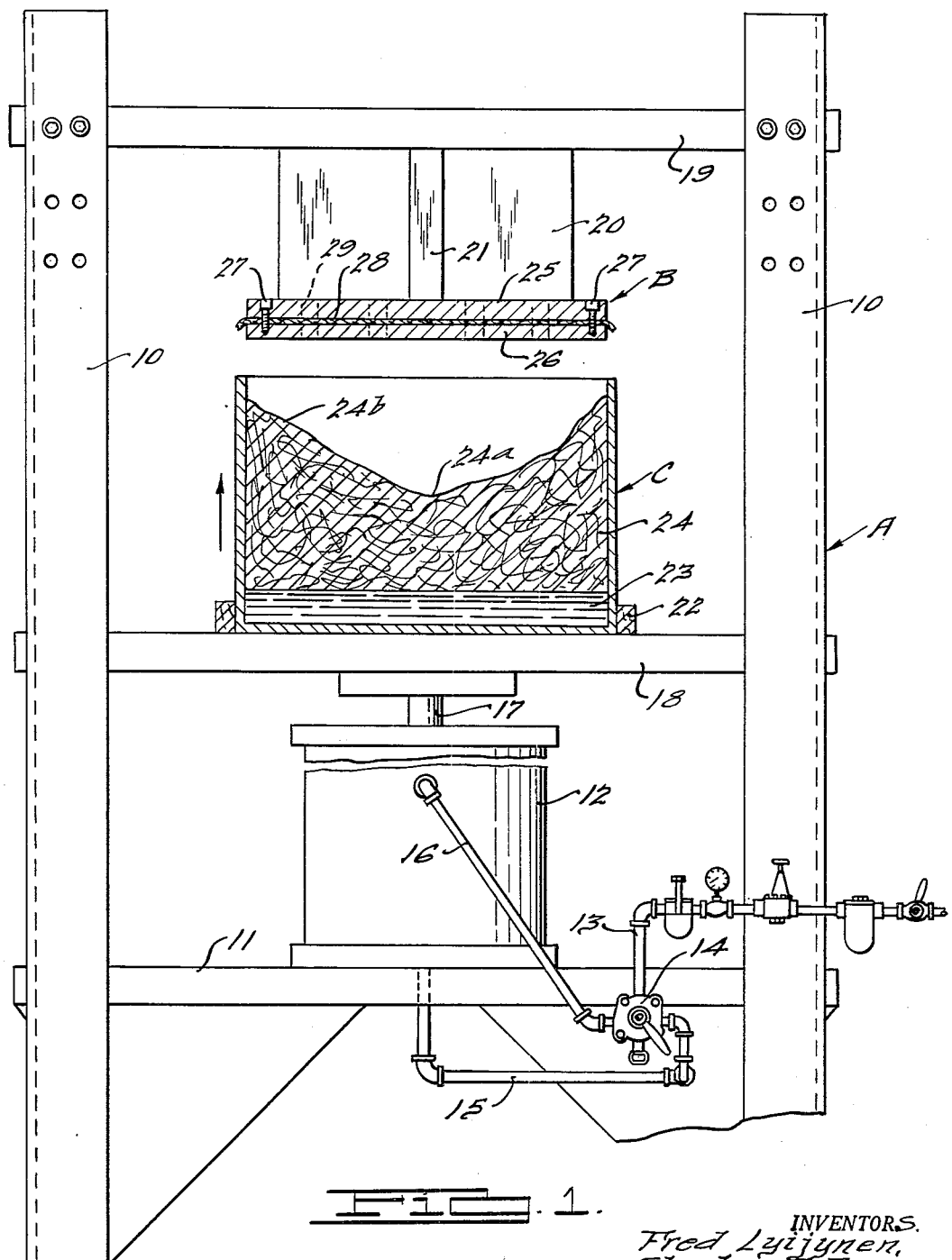

June 26, 1956  F. LYIJYNEN ET AL  2,751,626
APPARATUS AND METHOD FOR MAKING DIES
Filed Feb. 2, 1953  3 Sheets-Sheet 3
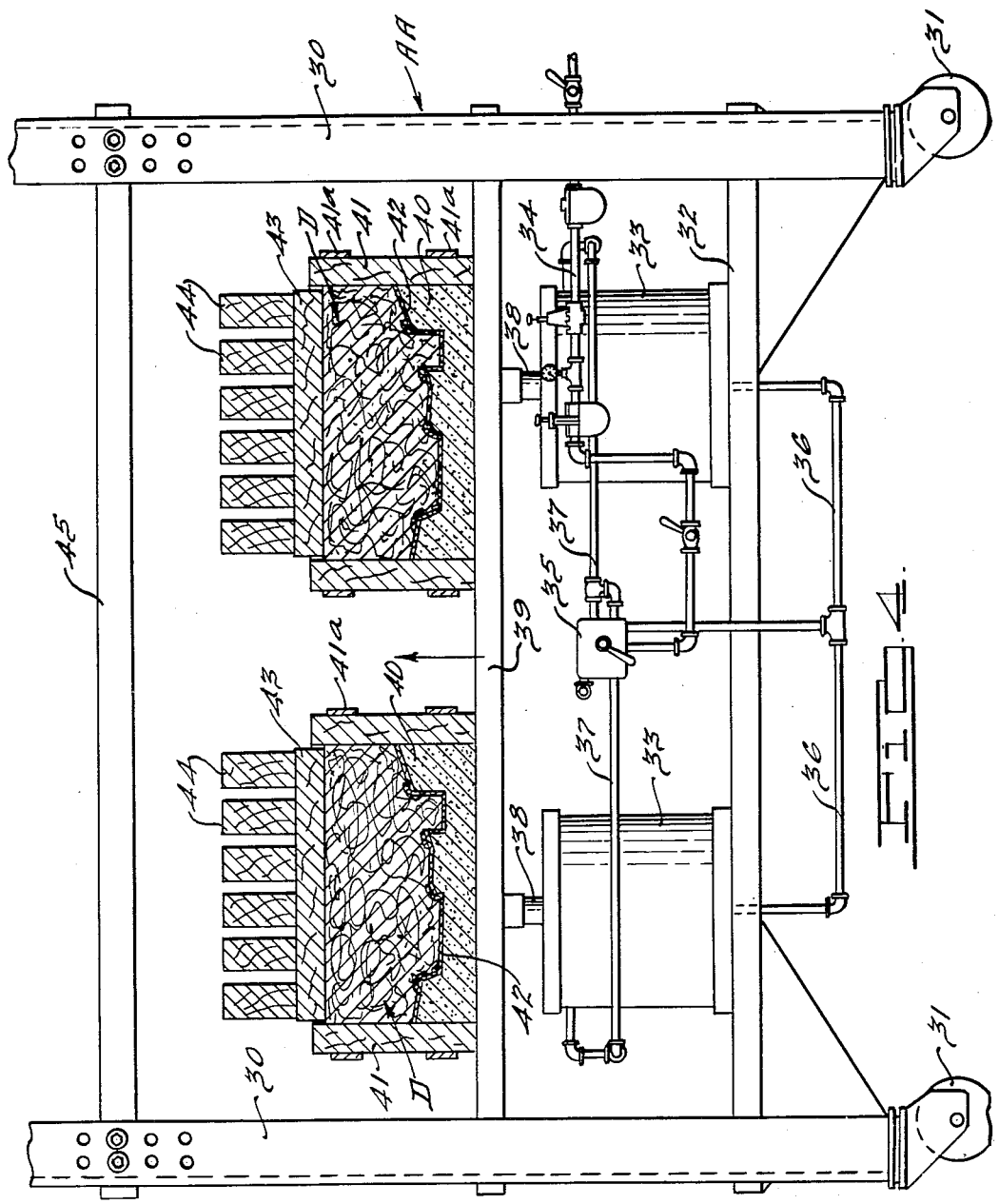
INVENTORS.
Fred Lyijynen,
Stanley I. Bey.
BY
Elmer Jamieson Gray
ATTORNEY.

United States Patent Office 2,751,626
Patented June 26, 1956

2,751,626

APPARATUS AND METHOD FOR MAKING DIES

Fred Lyijynen, Detroit, and Stanley I. Bey, Hazel Park, Mich., assignors, by mesne assignments, to Chrysler Corporation, a corporation of Delaware Application February 2, 1953, Serial No. 334,392

9 Claims. (Cl. 18—16)

This invention relates to dies and the manufacture thereof, an object of the invention being to provide an improved method and apparatus for making dies, such as forming dies, useful in press operations for forming or shaping sheet metal. Dies made in accordance with the invention are produced under pressure from a material consisting principally of a synthetic resin and glass fibers, such dies being distinguished by their toughness, hardness and wear resisting characteristics and being capable of successful use in stamping operations for forming sheet metal, such as sheet steel and sheet aluminum. By virtue of the present invention dies comparable in performance and usefulness to steel dies may be produced in a far shorter time and at a greatly reduced cost as compared with the enormous expense usually involved and the considerable time consumed in the fabrication of conventional steel dies.

The method utilized in making composite dies of glass fibers and synthetic resin in accordance with the present invention involves essentially three stages, namely, (1) the saturation of the glass fibers with the resin while the latter is in a liquid or flowable condition, (2) the compacting under pressure of the mass of resin and glass fibers against a pattern or the like having a shape or contour complementary to the desired shape or contour of the die in its final form, and (3) the curing or polymerization of the resin of the die, preferably by the application of heat in an oven, and while the compacted mass of resin and glass fibers is maintained under pressure against the pattern.

In carrying out the invention it is important that uniform saturation or wetting of the glass fibers with the resin be undertaken and that an even and uniform distribution of the resin throughout the mass of fibers be assured so that the finished die will have a uniform density throughout, thereby eliminating any areas containing an excess of resin which would result in weak spots in the die. This is accomplished during the first stage in the practice of the method of the present invention by forcing the resin under pressure into and through the mass of glass fibers. This step in the method may be performed by means of an air jack utilizing a cylindrical drum to contain the resin and mass of glass fibers and a punch or ram adapted to enter the drum upon closing movement of the air jack to compress the mass. A suitable quantity of resin is first poured into the drum, forming a layer on the bottom thereof. The bulk glass fibers are then introduced into the drum and this mass is centrally cupped or dished so that the depth of the glass fiber mass will progressively increase from the center of the mass outwardly toward the sides of the drum. The air jack is then operated to effect relative movement between the drum and punch or ram, the latter entering the drum and compacting the fiber glass mass downwardly against the layer of resin. The mass of fibers and layer of resin are in effect squeezed together, resulting in the resin being forced into and through the mass of fibers thereby effecting a thorough and uniform saturation thereof. Excess resin is permitted to pass upwardly through holes or perforations in the punch which are preferably screened to prevent any fibers from being entrained therewith. The excess resin formed as a layer on the upper side of the punch is drawn off for further use and the air jack opened to enable the intimate and uniform mixture of fibers and resin to be extracted from the drum.

In carrying out the next step or second stage of the process a pattern having the desired contour on its upper face is mounted upon a suitable support which may be a frame having upright side walls surrounding the pattern and forming a cavity within the enclosure above the pattern. The resin saturated mass of glass fibers in predetermined quantity is introduced into the cavity. Where it is desired to increase the hardness and wear or abrasive resistance of the surface of the finished die the contoured face of the pattern may first be covered with woven fiber glass cloth before introducing the resin impregnated fiber glass mass into the frame cavity. The face of the pattern being usually irregular, the fiber glass cloth is preferably cut into pieces which are laid over the contoured face of the pattern. In this manner the cloth can be fitted to any pattern contour. An air jack may be utilized to compact the fiber glass and resin materials against the pattern. The supporting frame carrying the pattern and materials is mounted on the lower member of the air jack and the upper punch or ram member is caused to enter the cavity within the frame and compact the fiber glass and resin materials against the pattern thereby forming a die in a plastic state having a contour on its lower face complementary to the contour of the pattern. The fiber glass cloth, when used as above indicated, will be pressed integrally into the compacted materials and form the working surface of the die.

The third step or stage of the process consists in curing or polymerizing the resin of the die to a final state of permanent hardness. This is accomplished while the materials are under compression between the upper and lower members of the air jack and without relinquishing the pressure on the materials. Curing of the resin may be accomplished by air drying aided by the heat of compression. However, to hasten the curing time it is preferred to wheel the air jack into an oven and subject the materials to heat for such interval of time as is needed to complete the curing or polymerization of the resin. When this has been completed the die in its finished form is removed from the air jack.

Other objects of this invention will appear in the following description and appended claims, reference being had to the accompanying drawings forming a part of this specification wherein like reference characters designate corresponding parts in the several views.

Fig. 1 is a fragmentary side elevation, partly in section, of an apparatus such as an air jack for producing a resin saturated fiber glass mass in accordance with the present invention.

Fig. 2 is a fragmentary view, in part similar to Fig. 1, illustrating the ram or punch and drum at the completion of the stroke and at which time the mass of glass fibers has been fully saturated or impregnated with the resin.

Fig. 3 is a section taken substantially through lines 3—3 of Fig. 2 looking in the direction of the arrows.

Fig. 4 is a fragmentary side elevation, partly in section, illustrating an apparatus such as an air jack for compacting a resin saturated fiber glass mass against a pattern to form a die.

Fig. 5 is a fragmentary view, in part similar to Fig. 4, illustrating the completion of the operation in which the resin and fiber glass mass is compacted against the pattern to form the die in its final form.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings we have illustrated, by way of example, certain apparatus which may be satisfactorily utilized for the purpose of producing dies from a material consisting principally of a synthetic resin and glass fibers. In Fig. 1 there is shown an air jack A comprising upright supporting frame members 10 carrying a lower stationary platform 11 upon which is rigidly mounted an air cylinder 12 having therein a conventional reciprocating piston (not shown). Air under pressure is conveyed from a suitable source of supply to a pipe or conduit 13 and thence to a control valve 14 from which the compressed air may be directed selectively to opposite sides of the piston within cylinder 12 by means of conduits or pipe lines 15 and 16. A piston rod 17 is attached to the piston and in turn is attached to a vertically reciprocable platform or frame 18 suitably guided for vertical travel by the four spaced upright frame members 10. A plurality of frame members 19 are adjustably bolted to the upper ends of the uprights 10. Rigidly secured to and depending from the members 19 are angularly related rigid support members 20 and 21 carrying at their lower edges the fixed punch or ram B of the air jack.

Mounted on the movable platform 18 and adapted to cooperate with the ram or punch B is an open top drum or cylinder C which may be removably held in fixed position upon the platform 18 by any suitable means such as locating strips or members 22 fastened to the platform.

In carrying out the first step of the process a predetermined amount of resin is poured into the bottom of the drum or container C, as indicated at 23 in Fig. 1. Thereafter a mass of dry or unwetted glass fibers 24 in predetermined quantity is introduced into the drum or container C above the layer of resin 23. The drum C may then be placed upon the platform 18 so as to be maintained by the locating members 22 in proper position with respect to the ram or punch B. A suitable thermo-setting resin is selected for use in connection with the process. Although various thermosetting resins may be utilized, we prefer to use a polyester type resin which in practice has given satisfactory results. As previously stated, it is important that uniform saturation or wetting of the glass fibers 24 with the resin 23 be accomplished so that the finished die will have a uniform density throughout. In order to aid in accomplishing this uniform saturation of the glass fibers, the bulk glass fibers, after they are introduced into the drum C, are centrally cupped or dished in a manner similar to that illustrated in Fig. 1 so that the mass will have materially less depth in the central region at 24a as compared with the depth of the mass around the sides of the drum as at 24b. In other words, by cupping or hollowing out the mass of glass fibers the depth of the mass will progressively increase from the center thereof outwardly toward the sides of the drum. This arrangement of the mass of glass fibers wherein a considerably greater quantity of the fibers is located around the sides of the drum permits a uniform and more complete saturation of the fibers than would be the case if the top of the fiber mass were level. This is due to the fact that during compression of the materials the resin has a tendency to flow out to the sides of the drum and as a result a larger quantity of the resin is forced upwardly through the mass of fiber glass at and near the sides of the drum than centrally thereof.

The ram or punch B in the present instance comprises a pair of upper and lower mating disks or plates 25 and 26, respectively, which may be rigidly secured together by screws 27. Interposd between the pressure plates 25 and 26 of the ram or punch is a layer of relatively coarse woven sheeting 28. Muslin sheeting may be used and in some instances a plurality such as two layers of this sheeting may be interposed between the pressure plates 25 and 26 and clamped therebetween when the plates are secured together by means of the screws 27. The plates 25 and 26 are formed with a number of aligned holes or perforations 29. It will be seen that the aligned perforations of each pair are separated by a portion of the fabric material 28 clamped between the plates thereby acting as a screen to prevent any glass fibers from passing through the perforations or holes 29, as hereinafter described.

With the parts arranged as illustrated in Fig. 1 the air valve 14 is manipulated to cause air under pressure to be introduced into the cylinder 12 through pipe line 15 thereby shifting the piston within the cylinder and the piston rod 17 upwardly. This operation results in shifting the platform 18 and drum C in an upward direction relative to the ram or punch B whereupon the ram is caused to enter the drum C and progressively squeeze the mass of fiber glass 24 and resin 23 together until the platform 18 reaches the end of its stroke as indicated in Fig. 2. It is desirable, in order to achive superior results, that the compression of the materials within the drum proceed relatively slowly and that a comparatively low air pressure, such as approximately twenty-five pounds' pressure per square inch, be used so that complete and uniform saturation of the glass fibers be obtained. As the glass fibers and resin are squeezed together the resin is forced into and through the mass of fibers. As the drum approaches the end of its stroke the excess resin, which has been forced through the compressed mass of glass fibers, will pass upwardly through the holes 29 in the pressure plates 25 and 26. It will be understood that the resin will pass through the fabric material 28 at the locality of the holes or perforations 29, this fabric acting as a screen to prevent any of the glass fibers from passing through the holes or perforations in the plates. At the completion of the stroke of the drum a layer of excess resin 23a, as indicated in Fig. 2, will be formed upon the upper face of the ram or punch B, and between the ram and the bottom of the drum there will be formed a resin saturated mass of glass fibers D. During this operation the pressure is maintained until the excess resin seeps through the perforations 29 in the ram pressure plates and covers the top thereof. When this occurs it is indicated that the glass fibers have been thoroughly and evenly saturated or wetted with the resin. The excess resin 23a, which has been squeezed out of the saturated fiber glass mass, is drawn off for re-use, and after the ram and drum have been separated by reversing the operation of the air cylinder mechanism the resin saturated mass of fiber glass is removed for use in carrying out the next step of the process.

By virtue of the foregoing step in the process it is possible to produce a homogeneous mixture containing a materially greater amount of glass fibers by weight than would be the case if the materials were mechanically stirred together. In other words, the method enables the quantity of fibers in the mass to be increased to approximately fifty percent of the mass by weight while at the same time effecting a uniform distribution of the resin throughout the mass. The increased amount of fiber glass in the mixture is advantageous in that a stronger and tougher die is produced. As an example, the quantity of resin poured into the drum may be from one and one-half to two times the weight of the glass fibers introduced into the drum. This allows for an excess of resin to be squeezed out of the mass and pass through the perforations in the ram pressure plates. The resulting mass of resin and fiber glass will then comprise nearly or approximately equal proportions by weight of the resin and fiber glass.

The next step of the process consists in compacting the resin saturated mass of fiber glass against a suitable pattern for the purpose of forming a die in its final shape or form. This may be accomplished by a suitable apparatus such as an air jack similar to that described in connection with Fig. 1. A single die may be produced in one operation by means of the air jack or, as illustrated in Fig. 4, a double air cylinder jack may be employed so as to enable two dies to be formed in one operation. Since Fig. 4 illustrates the formation of two similar dies by means of the air jack apparatus, the following description relating to the formation of one die will suffice for both.

The air jack, indicated generally at AA in Fig. 4, comprises upright supporting frame members 30 carrying casters 31 at the lower ends thereof to render the air jack portable. The frame carries a lower stationary platform 32 upon which is rigidly mounted a pair of similar air cylinders 33, each having therein a conventional reciprocating piston (not shown). Air under pressure is conveyed from a suitable source of supply to a pipe or conduit 34 and thence to a control valve 35 from which the compressed air may be directed simultaneously and selectively to opposite sides of the pistons within the cylinders 33 by means of conduits or pipe lines 36 and 37. A piston rod 38 is attached to each piston and in turn attached to a vertically reciprocable platform 39 suitably guided for vertical travel by the upright frame members 30. The pattern 40 to be used in forming the contour of the die is mounted upon the platform 39 and confined within an upright box-like frame 41, the sides of which completely surround the pattern. The frame 41 may be anchored in any suitable manner to the platform and the side walls thereof extend upwardly above the pattern 40 so as to provide a cavity of suitable depth above the pattern. The pattern 40 is preformed before introducing the same into the box-like frame 41 and may be fabricated from suitable material such as wood, plaster or metal, having a contour on its upper face complementary to the contour to be imparted to the die.

In cases where the die is to be used in a press for forming or shaping sheet steel we have found it desirable to increase the hardness and toughness of the working surface of the die so as to increase its resistance to wear and abrasive action during press operations, thus prolonging the life of the die. This is accomplished in accordance with the invention by covering the face of the pattern 40, after it has been installed within the box-like frame 41, with woven fiber glass cloth or fabric. On account of the usual irregularity of the surface of the pattern, such as indicated by way of example in Figs. 4 and 5, the fiber glass cloth is preferably cut into relatively small pieces or sections, such as approximately four inch square pieces. These pieces are laid over the pattern face with the edges of the pieces preferably overlapped so as to completely cover the pattern. This covering layer of fiber glass cloth is indicated at 42 in Figs. 4 and 5. In this fashion the contoured surface of any pattern, regardless of its irregularity, can be covered. Thereafter the resin impregnated or saturated mass of fiber glass D is introduced into the frame cavity so as to cover to the desired depth the fiber glass cloth covered pattern, see Fig. 4. The loose mass of fiber glass saturated with resin is packed into the cavity so as to give as uniform a depth thereof over the pattern as possible.

Compacting of the resin impregnated fiber glass mass D is in the present instance accomplished by means of a ram or punch comprising a flat pressure member 43 reinforced by means of a series of members 44 secured to the upper side thereof. The pressure member 43 is shaped to fit within the frame enclosure 41, preferably however with a slight clearance around the edges of the pressure member so as to permit some excess resin to bleed or be squeezed past the ram during the compression operation. In order to withstand adequately outward pressures imposed upon the frame 41 the latter may be, if desired, reinforced by means of steel bands 41a.

After the mass of resin and glass fibers has been introduced into the cavity of the frame 41, as indicated in Fig. 4, the punch or ram 43, 44 is then placed in position within the upper part of the open frame and pressed down against the mass of fibers. Air under pressure is then introduced through lines 36 into the cylinder causing the platform 39 to be shifted upwardly carrying with it the frame 41 and its contents as well as the ram or punch 43, 44. Bolted to the frame members 30 above the ram are a number of transverse frame bars 45 which may be adjusted vertically on the uprights 39 so as to position them at the proper height so as to accommodate the desired length of stroke of the pistons within the cylinders 33. Upon upward travel of the platform 39 a given distance the ram members 44 will contact or abut the members 45 thereby causing the punch or ram 43, 44 to be forced downwardly into the cavity within frame 41 and compressing the fiber glass mass against the pattern 40. At the beginning of this stage a relatively low line pressure is desirable so as to permit some lateral flow of the wet mass within the cavity to attain greater uniformity in the density of the mass at all points and to permit any excess resin to bleed or be forced out between the edges of the ram and the walls of the frame enclosure 41. As the resin fluid content of the mass decreases somewhat after the initial stage of compression, which may also be accompanied by some increase in the viscosity of the resin due to a certain degree of setting or curing of the resin being initiated, the line pressure is progressively increased until a pressure on the order of one hundred pounds per square inch is reached. At the end of the stroke, as indicated in Fig. 5, the resin impregnated fiber glass mass becomes fully compacted against the pattern, at which time the die E (Fig. 5) has assumed its final form. During the compression stage a portion of the resin of the mass is forced into and through the interstices of the fiber glass cloth, filling all voids, pores and irregularities and producing with the cloth a smooth, glazed surface of great hardness and wear resistant properties.

After completion of the compression stage, as illustrated in Fig. 5, in which the resin impregnated fiber glass mass is fully compacted against the pattern 40 and given on its lower face the exact contour of the upper face of the pattern, the formed die E is maintained under constant pressure until the resin content thereof has been cured or completely polymerized. Curing may be undertaken by allowing the apparatus to stand without oven drying, the curing being aided under such conditions by the heat of compression imparted to the materials during the compacting thereof. Since curing proceeds slowly by air drying, we prefer to reduce the curing period and accelerate the operation by wheeling the entire apparatus of Fig. 4 into an oven and subjecting the formed die to raised temperatures while confined under constant pressure within the air jack. In other words, the final pressure applied to the mass in forming the die is preferably maintained constant during the curing of the resin content of the die. Where oven drying is utilized a temperature on the order of 180° F. has been found satisfactory. When the die is fully hardened with the resin content thereof polymerized or cured to a final stage, the pressure may be reversed in the air cylinders thereby lowering the platform 39 and releasing the pressure on the die which may then be removed in finished condition from the frame enclosure 41.

By forming the die E and curing the resin content thereof while the die is maintained in the air jack under substantially constant pressure, we have found that the finished die is characterized by a very high degree of accuracy as to dimensions, this being due largely to the fact that by curing the die under pressure the overall shrinkage thereof is reduced to a practically negligible amount. Moreover, a die produced in accordance with the present process is substantially uniform in density throughout, being substantially free of any weak spots consequent to the presence of an excess of resin at any localities in the die. The process has the further important advantage of enabling a die to be produced which is relatively rich in its fiber glass content thereby enhancing the strength and toughness of the die and prolonging materially the life thereof.

It will be apparent that the present invention is readily applicable to the production not only of various kinds of dies for use in press operations but also for molds and the like, hammer forms, die dummies, die models etc., and it is, therefore, understood that the term "die" used herein is intended to comprehend and refer to generally such articles and to include the same within the scope of the term.

We claim:

1. In an apparatus for preparing a resin saturated mass of glass fibers for use in making a die, upper and lower relatively movable press members, a container adapted to be supported on the lower press member and adapted to contain a quantity of liquid resin and a quantity of fiber glass, said upper press member being dimensioned to snugly enter said container and in cooperation therewith to compress said resin and fiber glass together upon relative movement of the press members, said upper press member comprising a pair of apertured pressure plates and a fiber glass screening layer interposed between said plates, and said screening layer and the apertures in said plates providing for the escape of excess resin therethrough during the compression operation.

2. The method of preparing a resin impregnated mass of fiber glass for use in making a die, including the steps of introducing into a container having rigid bottom and side walls a quantity of synthetic resin in flowable condition, introducing into the container an unwoven mass of fiber glass, arranging said mass so that its thickness increases from the center to the edges of said container, and causing a press member of rigid material having screened apertures therethrough to enter said container, thereby to squeeze the resin and fiber glass together to force the resin into and through the mass of fibers with an excess of the resin flowing outwardly through said screened apertures.

3. The method of preparing a resin impregnated mass of fiber glass for use in making a die, including the steps of introducing into a container having rigid bottom and side walls a quantity of synthetic resin in flowable condition, introducing into the container an unwoven mass of fiber glass, arranging said mass so that its thickness increases from the center to the edges of said container, causing a press member of rigid material having screened apertures therethrough to enter said container, thereby to squeeze the resin and fiber glass together to force the resin into and through the mass of fibers with an excess of the resin flowing outwardly through said screened apertures, thereafter arranging the compacted and resin impregnated mass of fiber glass on a pattern, supporting said pattern with said mass thereon on a press member of rigid material within the bottom of an enclosure having rigid side walls and introducing another press member of rigid material into the enclosure and relatively moving said press members to compact said mass against the pattern to form a die.

4. The method of preparing a resin impregnated mass of fiber glass for use in making a die, including the steps of introducing into a container having rigid bottom and side walls a quantity of synthetic resin in flowable condition, introducing into the container an unwoven mass of fiber glass, arranging said mass so that its thickness increases from the center to the edges of said container, causing a press member of rigid material having screened apertures therethrough to enter said container, thereby to squeeze the resin and fiber glass together to force the resin into and through the mass of fibers with an excess of the resin flowing outwardly through said screened apertures, thereafter arranging the compacted and resin impregnated mass of fiber glass on a pattern, supporting said pattern with said mass thereon on a press member of rigid material within the bottom of an enclosure having rigid side walls, and introducing another press member of rigid material into the enclosure and relatively moving said press members to compact said mass against the pattern to form a die, and allowing said die to harden while maintaining the same under pressure against the pattern between said press members.

5. The method of preparing a resin impregnated mass of fiber glass for use in making a die, including the steps of introducing into a container having rigid bottom and side walls a quantity of synthetic resin in flowable condition, introducing into the container a mass of fiber glass, arranging said mass so that its thickness increases from the center to the edges of said container, and causing a press member of rigid material having screened apertures therethrough to enter said container, thereby to squeeze the resin and fiber glass together to force the resin into and through the mass of fibers with an excess of the resin flowing outwardly through said screened apertures.

6. The method of preparing a resin impregnated mass of fiber glass for use in making a die, including the steps of introducing into a container having rigid bottom and side walls a quantity of synthetic resin in flowable condition, introducing into the container an unwoven mass of fiber glass, and causing a press member of rigid material having screened apertures therethrough to enter said container, thereby to squeeze the resin and fiber glass together to force the resin into and through the mass of fibers with an excess of the resin flowing outwardly through said screened apertures.

7. The method of preparing a resin impregnated mass of fiber glass for use in making a die, including the steps of introducing into a container having rigid bottom and side walls a quantity of synthetic resin in flowable condition, introducing into the container a mass of fiber glass, and causing a press member of rigid material having screened apertures therethrough to enter said container, thereby to squeeze the resin and fiber glass together to force the resin into and through the mass of fibers with an excess of the resin flowing outwardly through said screened apertures.

8. In an apparatus for preparing a resin saturated mass of glass fibers for use in making a die, upper and lower relatively movable press members, a container adapted to be supported on the lower press member and adapted to contain a quantity of liquid resin and a quantity of fiber glass, said upper press member having a screened aperture therethrough and being dimensioned to snugly enter said container and in cooperation therewith to compress said resin and fiber glass together upon relative movement of the press members, and said screened aperture providing for the escape of excess resin therethrough during the compression operation.

9. In an apparatus for preparing a resin saturated mass of glass fibers for use in making a die, a pair of relatively movable press members, a container adapted to be supported by one press member and adapted to contain a quantity of liquid resin and a quantity of fiber glass, the other press member having a screened aperture therethrough and being dimensioned to snugly enter said container and in cooperation therewith to compress said resin and fiber glass together upon relative movement of the press members, and said screened aperture providing for the escape of excess resin therethrough during the compression operation.

References Cited in the file of this patent

UNITED STATES PATENTS

| | | |
|---|---|---|
| 2,441,548 | Sperry | May 11, 1948 |
| 2,495,640 | Muskat | Jan. 24, 1950 |